US012566768B1

(12) United States Patent
Oncevay et al.

(10) Patent No.: US 12,566,768 B1
(45) Date of Patent: Mar. 3, 2026

(54) METHOD AND SYSTEM FOR DETERMINING SIMILARITIES BETWEEN ENTITIES

(71) Applicant: JPMorgan Chase Bank, N.A., New York, NY (US)

(72) Inventors: Arturo Oncevay, London (GB); Simerjot Kaur, Danville, CA (US); Joy Sain, Jamaica, NY (US); Xiaomo Liu, Manhasset, NY (US); Chen Ling, Verona, NJ (US); Daniel Governara, Ho Ho Kus, NJ (US); Brian P Clementi, Jersey City, NJ (US); Charese Smiley, Bristol, WI (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/987,282

(22) Filed: Dec. 19, 2024

(51) Int. Cl.
*G06F 16/2457* (2019.01)
*G06F 16/2455* (2019.01)

(52) U.S. Cl.
CPC .... *G06F 16/24578* (2019.01); *G06F 16/2455* (2019.01)

(58) Field of Classification Search
CPC ........................ G06F 16/2455; G06F 16/24578
See application file for complete search history.

(56) References Cited

U.S. PATENT DOCUMENTS

| 2017/0270610 A1* | 9/2017 | Kee | ........................ G06Q 40/06 |
| 2025/0095014 A1* | 3/2025 | Magdelinic | ............ G06Q 40/04 |

* cited by examiner

*Primary Examiner* — Jay A Morrison
(74) *Attorney, Agent, or Firm* — GREENBLUM & BERNSTEIN, P.L.C.

(57) ABSTRACT
A method and a system for determining similarities between entities are provided. The method includes: receiving a request to determine an estimate for a first instrument; generating a query to identify corresponding first data sources that contain data about an entity; identifying, using the generated query, the corresponding first data sources from a system of computer networks; filtering the corresponding first data sources in order to determine at least one primary data source; extracting corresponding first information that relates to the respective entity from the at least one primary data source; identifying, using a large language model, corresponding entity-specific information based on the extracted corresponding first information; comparing the entity-specific information of a first entity with entity-specific information for a plurality of entities; and generating a similarity ranking that list each respective entity from among the plurality of entities in relation to the first entity.

20 Claims, 8 Drawing Sheets

<u>100</u>

100

300

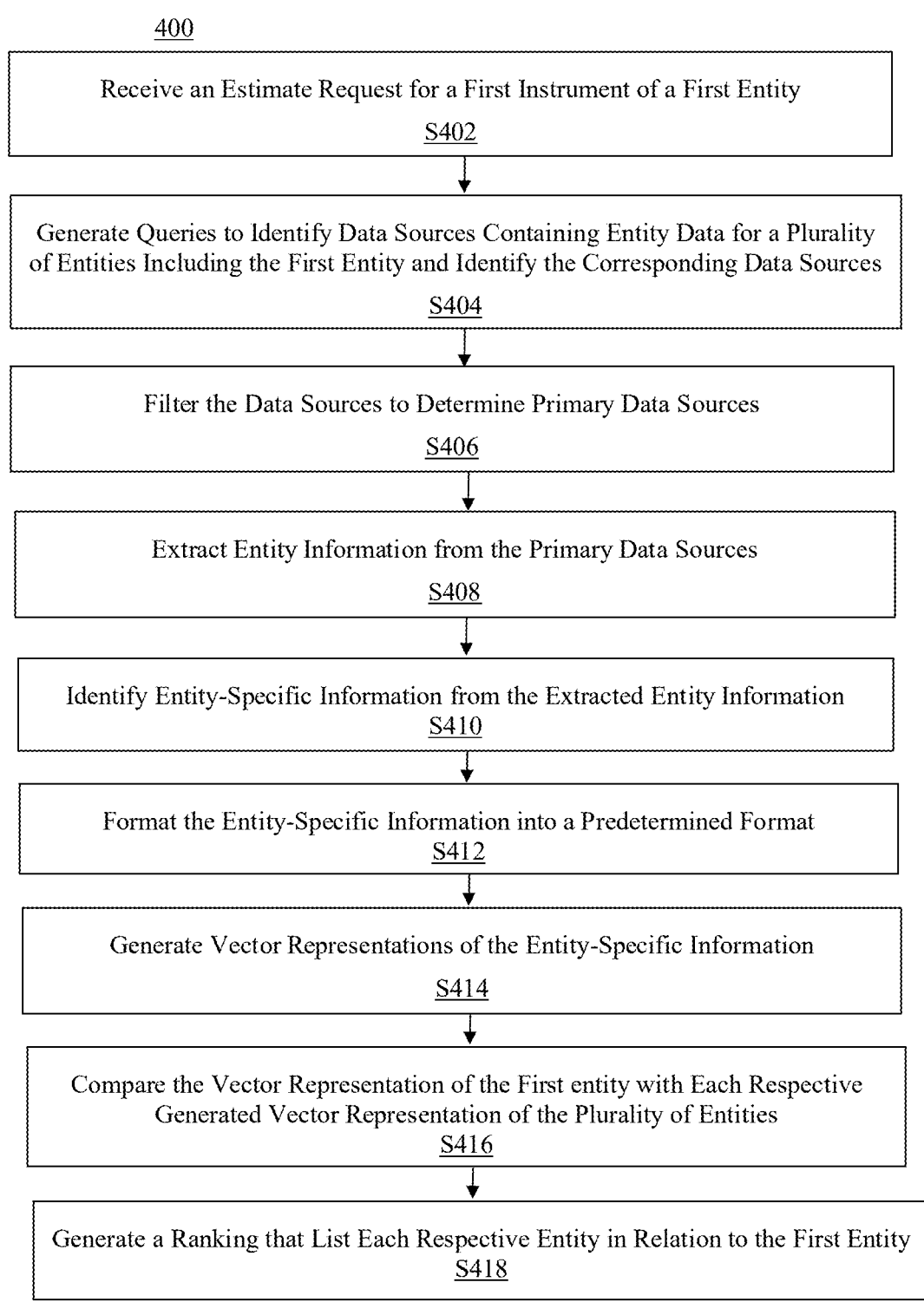

400

Receive an Estimate Request for a First Instrument of a First Entity
S402

Generate Queries to Identify Data Sources Containing Entity Data for a Plurality of Entities Including the First Entity and Identify the Corresponding Data Sources
S404

Filter the Data Sources to Determine Primary Data Sources
S406

Extract Entity Information from the Primary Data Sources
S408

Identify Entity-Specific Information from the Extracted Entity Information
S410

Format the Entity-Specific Information into a Predetermined Format
S412

Generate Vector Representations of the Entity-Specific Information
S414

Compare the Vector Representation of the First entity with Each Respective Generated Vector Representation of the Plurality of Entities
S416

Generate a Ranking that List Each Respective Entity in Relation to the First Entity
S418

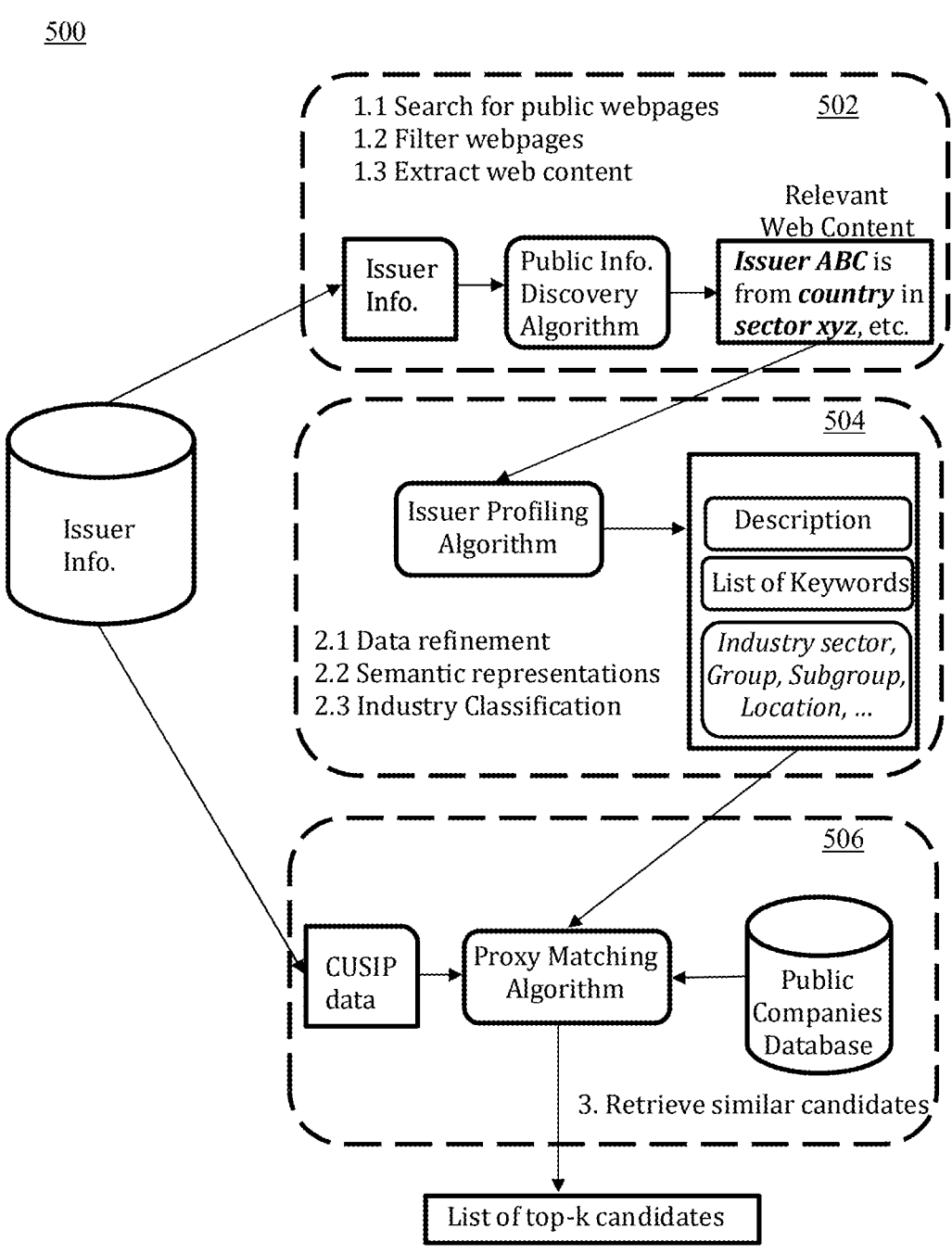

1.1 Search for public webpages    502
1.2 Filter webpages
1.3 Extract web content Relevant
Web Content Issuer
Info.

Public Info.
Discovery
Algorithm

*Issuer ABC* is
from *country* in
*sector xyz*, etc.

504

Issuer Profiling
Algorithm

Description

List of Keywords

*Industry sector,
Group, Subgroup,
Location, ...*

2.1 Data refinement
2.2 Semantic representations
2.3 Industry Classification

Issuer
Info.

506

CUSIP
data

Proxy Matching
Algorithm

Public
Companies
Database

3. Retrieve similar candidates

List of top-k candidates

METHOD AND SYSTEM FOR DETERMINING SIMILARITIES BETWEEN ENTITIES

BACKGROUND

1. Field of the Disclosure

This technology generally relates to methods and systems for determining similarities between entities, and more particularly to methods and systems for extracting and comparing entity information to generate a list that ranks entities based on their similarity to a selected entity.

2. Background Information

Accurate bond pricing is essential for stable financial markets, as it guides investors, portfolio managers, and risk analysts in making informed decisions. Key factors include interest rates, credit risk, and market conditions. Bond prices move inversely with interest rates; when rates rise, bond prices fall, and vice versa. Credit risk, which measures the likelihood of issuer default, influences pricing by requiring higher yields for higher risks. Additionally, market conditions such as supply and demand, investor sentiment, and macroeconomic factors significantly impact bond prices.

Bond pricing typically relies on market data and dealer quotes. Pricing liquid bonds is relatively straightforward due to available data. However, for illiquid bonds, the evaluation process presents challenges because of infrequent trading and limited data. This complexity can lead to inaccurate valuations and flawed risk assessments. Accurate valuations are vital for regulatory compliance, performance measurement, and asset allocation. One effective method involves identifying comparable issuers and using their liquid bonds as proxies to estimate values for illiquid bonds. This approach ensures that market sentiment and conditions are incorporated, maintaining valuation integrity, and supporting reliable investment decisions.

Previous studies on using machine learning (ML) and artificial intelligence (AI) for bond pricing have primarily focused on estimating bond prices directly. While these methods are innovative, they often bypass the nuanced process of identifying and analyzing comparable liquid bonds. These approaches focused more on bond pricing methodology, while overlooking one of the major challenges of pricing illiquid bonds-lacking market data as well as neglecting the subtleties and specificities associated with different issuers, potentially resulting in less accurate pricing models.

Current illiquid bond identification mechanisms require large amounts of system resources and memory usage that makes a system for pricing illiquid bonds impractical. Particularly, existing technology requires a variety of third-party systems and unintegrated software that are unfeasible for quickly and accurately generating the appropriate information to estimate pricing for illiquid instruments.

Accordingly, there is a need for methods and systems that reduce unnecessary system memory and computing resources by integrating a plurality of mechanisms required for performing the pricing of illiquid bonds onto a single system or platform.

SUMMARY

The present disclosure, through one or more of its various aspects, embodiments, and/or specific features or sub-components, provides, inter alia, various systems, servers, devices, methods, media, programs, and platforms for extracting and comparing entity information to generate a list that ranks entities based on their similarity to a selected entity. According to an aspect of the present disclosure, a method for determining similarities between entities is provided. The method may be implemented by at least one processor. The method may include: receiving, by the at least one processor, a request to determine an estimate for a first instrument that relates to a first entity from among a plurality of entities; for each respective entity from among the plurality of entities, generating, by the at least one processor, a respective query to identify corresponding first data sources that contain respective data about the respective entity; for each respective entity from among the plurality of entities, identifying, by the at least one processor using the generated respective query, the corresponding first data sources from a system of computer networks; for each respective entity from among the plurality of entities, filtering, by the at least one processor based on predetermined filtering criteria, the corresponding first data sources in order to determine at least one respective primary data source; for each respective entity from among the plurality of entities, extracting, by the at least one processor, corresponding first information that relates to the respective entity from the at least one respective primary data source; for each respective entity from among the plurality of entities, identifying, by the at least one processor using a large language model (LLM), corresponding entity-specific information based on the extracted corresponding first information; for each respective entity from among the plurality of entities, formatting, by the at least one processor using the LLM, the identified corresponding entity-specific information into a predetermined format; for each respective entity from among the plurality of entities, generating, by the at least one processor via a Transformer-based Sentence Embedding model, a vector representation of the formatted identified corresponding entity-specific information; comparing, by the at least one processor, the respective generated vector representation of the first entity with each respective generated vector representation of the plurality of entities; and generating, by the at least one processor, a similarity ranking that list each respective entity from among the plurality of entities in relation to the first entity based on a result of the comparing, wherein the similarity ranking is used to determine a price estimate of the first instrument.

The corresponding entity-specific information may include at least one from among a geographical location of the respective entity, a summary of information that relates to the respective entity, at least one industry keyword that relates to the respective entity, and an industry summary of information that relates to an industry for which the respective entity belongs.

The method may further include: for each respective entity from among the plurality of entities, generating, by the at least one processor using the LLM and based on the extracted corresponding first information, a corresponding sector definition that relates to a sector of an economy, a corresponding group definition that relates to a portion of the sector that corresponds to a first predetermined criteria, and a corresponding subgroup definition that relates to a portion of the group that corresponds to a second predetermined criteria; for each respective entity from among the plurality of entities, classifying, by the at least one processor, the respective entity into a corresponding sector from among a plurality of sectors, a corresponding group from among a plurality of groups, and a corresponding subgroup from among a plurality of subgroups based on the results of the generating of the corresponding sector definition, the corresponding group definition, and the corresponding subgroup definition; comparing, by the at least one processor, the results of the classifying for the first entity with the results of the classifying for each other respective entity; and the generating of the similarity ranking may be further based on the results of the comparing of the results of the classifying.

The classifying may further include performing a top-down approach and a bottom-up approach, and combining the results from the top-down approach and the bottom-up approach to generate the results of the classifying; wherein the top-down approach, for each respective entity from among the plurality of entities, may include: first, classifying, based on the corresponding first information, the respective entity into a top-down approach corresponding sector; next, classifying, based on the corresponding first information, the respective entity into a top-down approach corresponding group belonging to the top-down approach corresponding sector; and then, classifying, based on the corresponding first information, the respective entity into a top-down approach corresponding subgroup belonging to the top-down approach corresponding group; wherein the bottom-up approach may comprise: first, classifying, based on the corresponding first information, the respective entity into a bottom-up approach corresponding subgroup; next, classifying, based on the corresponding first information, the respective entity into a bottom-up approach corresponding group belonging to the bottom-up approach corresponding subgroup; and then, classifying, based on the corresponding first information, the respective entity into a bottom-up approach corresponding sector belonging to the bottom-up approach corresponding group.

The extracting of the corresponding first information may include at least one from among parsing a markup language of the at least one respective primary data source to obtain textual content corresponding to relevant sections of the at least one respective primary data source and using an application programming interface (API) to collect summaries and specific sectional data from the at least one respective primary data source.

The formatting of the identified corresponding entity-specific information into the predetermined format may include extracting keywords from the corresponding entity-specific information and converting the extracted keywords into natural language phrasing that describes a corresponding area of operation of the respective entity.

The generating of the similarity ranking may include: calculating, by the at least one processor, a cosine similarity score between the respective generated vector representation of the first entity and each respective generated vector representation of the plurality of entities; ranking, by the at least one processor, each respective entity from among the plurality of entities in relation to the first entity based on the respective calculated cosine similarity score; and matching, by the at least one processor, each respective entity from among the plurality of entities to a corresponding Committee on Uniform Security Identification Procedures (CUSIP) identification that is usable for representing the respective entity in the generated similarity ranking.

The method may further include: identifying, by the at least one processor based on the generated similarity ranking, at least one similar entity from the plurality of entities that relates to a second instrument that is comparable to the first instrument; and determining, by the at least one processor based on the results of the identifying of the at least one similar entity, the estimate for the first instrument.

The first instrument may be an illiquid bond.

According to another aspect of the present disclosure, a computing apparatus for retrieving data for determining similarities is provided. The computing apparatus includes a processor; a memory; a display; and a communication interface coupled to each of the processor, the memory, and the display. The processor may be configured to: receive a request to determine an estimate for a first instrument that relates to a first entity from among a plurality of entities; for each respective entity from among the plurality of entities, generate a respective query to identify corresponding first data sources that contain respective data about the respective entity; for each respective entity from among the plurality of entities, identify, using the generated respective query, the corresponding first data sources from a system of computer networks; for each respective entity from among the plurality of entities, filter, based on predetermined filtering criteria, the corresponding first data sources in order to determine at least one respective primary data source; for each respective entity from among the plurality of entities, extract corresponding first information that relates to the respective entity from the at least one respective primary data source; for each respective entity from among the plurality of entities, identify using an LLM, corresponding entity-specific information based on the extracted corresponding first information; for each respective entity from among the plurality of entities, format, using the LLM, the identified corresponding entity-specific information into a predetermined format; for each respective entity from among the plurality of entities, generate, via a Transformer-based Sentence Embedding model, a vector representation of the formatted identified corresponding entity-specific information; compare the respective generated vector representation of the first entity with each respective generated vector representation of the plurality of entities; and generate a similarity ranking that list each respective entity from among the plurality of entities in relation to the first entity based on a result of the comparing, wherein the similarity ranking is used to determine a price estimate of the first instrument.

The corresponding entity-specific information may include at least one from among a geographical location of the respective entity, a summary of information that relates to the respective entity, at least one industry keyword that relates to the respective entity, and an industry summary of information that relates to an industry for which the respective entity belongs.

The processor may be further configured to: for each respective entity from among the plurality of entities, generate, using the LLM and based on the extracted corresponding first information, a corresponding sector definition that relates to a sector of an economy, a corresponding group definition that relates to a portion of the sector that corresponds to a first predetermined criteria, and a corresponding subgroup definition that relates to a portion of the group that corresponds to a second predetermined criteria; for each respective entity from among the plurality of entities, classify the respective entity into a corresponding sector from among a plurality of sectors, a corresponding group from among a plurality of groups, and a corresponding subgroup from among a plurality of subgroups based on the results of the generating of the corresponding sector definition, the corresponding group definition, and the corresponding subgroup definition; compare the results of the classifying for the first entity with the results of the classifying for each other respective entity; and the generating of the similarity ranking may be further based on the results of the comparing of the results of the classifying.

The processor may be further configured to: classify each respective entity by performing a top-down approach and a bottom-up approach, and combining the results from the top-down approach and the bottom-up approach; wherein the top-down approach, for each respective entity from among the plurality of entities, may include: first, classifying, based on the corresponding first information, the respective entity into a top-down approach corresponding sector; next, classifying, based on the corresponding first information, the respective entity into a top-down approach corresponding group belonging to the top-down approach corresponding sector; and then, classifying, based on the corresponding first information, the respective entity into a top-down approach corresponding subgroup belonging to the top-down approach corresponding group; wherein the bottom-up approach may include: first, classifying, based on the corresponding first information, the respective entity into a bottom-up approach corresponding subgroup; next, classifying, based on the corresponding first information, the respective entity into a bottom-up approach corresponding group belonging to the bottom-up approach corresponding subgroup; and then, classifying, based on the corresponding first information, the respective entity into a bottom-up approach corresponding sector belonging to the bottom-up approach corresponding group.

The processor may be further configured to: extract the corresponding first information by performing at least one from among parsing a markup language of the at least one respective primary data source to obtain textual content corresponding to relevant sections of the at least one respective primary data source and using an API to collect summaries and specific sectional data from the at least one respective primary data source.

The processor may be further configured to: format the identified corresponding entity specific information into the predetermined format by extracting keywords from the corresponding entity-specific information and converting the extracted keywords into natural language phrasing that describes a corresponding area of operation of the respective entity.

The processor may be further configured to: generate the similarity ranking by: calculating a cosine similarity score between the respective generated vector representation of the first entity and each respective generated vector representation of the plurality of entities; ranking each respective entity from among the plurality of entities in relation to the first entity based on the respective calculated cosine similarity score; and matching each respective entity from among the plurality of entities to a corresponding CUSIP identification that is usable for representing the respective entity in the generated similarity ranking.

The processor may be further configured to: identify, based on the generated similarity ranking, at least one similar entity from the plurality of entities that relates to a second instrument that is comparable to the first instrument; and determine, based on the results of the identifying of the at least one similar entity, the estimate for the first instrument The first instrument may be an illiquid bond.

According to yet another aspect of the present disclosure, a non-transitory computer readable storage medium storing instructions for retrieving data for determining similarities is provided. The storage medium includes executable code which, when executed by a processor, causes the processor to: receive a request to determine an estimate for a first instrument that relates to a first entity from among a plurality of entities; for each respective entity from among the plurality of entities, generate a respective query to identify corresponding first data sources that contain respective data about the respective entity; for each respective entity from among the plurality of entities, identify, using the generated respective query, the corresponding first data sources from a system of computer networks; for each respective entity from among the plurality of entities, filter, based on predetermined filtering criteria, the corresponding first data sources in order to determine at least one respective primary data source; for each respective entity from among the plurality of entities, extract corresponding first information that relates to the respective entity from the at least one respective primary data source; for each respective entity from among the plurality of entities, identify using a LLM, corresponding entity-specific information based on the extracted corresponding first information; for each respective entity from among the plurality of entities, format, using the LLM, the identified corresponding entity-specific information into a predetermined format; for each respective entity from among the plurality of entities, generate, via a Transformer-based Sentence Embedding model, a vector representation of the formatted identified corresponding entity-specific information; compare the respective generated vector representation of the first entity with each respective generated vector representation of the plurality of entities; and generate a similarity ranking that list each respective entity from among the plurality of entities in relation to the first entity based on a result of the comparing, wherein the similarity ranking is used to determine a price estimate of the first instrument.

The storage medium may be further configured to cause the processor to: for each respective entity from among the plurality of entities, generate, using the LLM and based on the extracted corresponding first information, a corresponding sector definition that relates to a sector of an economy, a corresponding group definition that relates to a portion of the sector that corresponds to a first predetermined criteria, and a corresponding subgroup definition that relates to a portion of the group that corresponds to a second predetermined criteria; for each respective entity from among the plurality of entities, classify the respective entity into a corresponding sector from among a plurality of sectors, a corresponding group from among a plurality of groups, and a corresponding subgroup from among a plurality of subgroups based on the results of the generating of the corresponding sector definition, the corresponding group definition, and the corresponding subgroup definition; compare the results of the classifying for the first entity with the results of the classifying for each other respective entity; and the generating of the similarity ranking may be further based on the results of the comparing of the results of the classifying.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 illustrates a process diagram of a process for extracting and comparing entity information to generate a list that ranks entities based on their similarity to a selected entity, according to an embodiment.

FIG. 5 illustrates a flow diagram of a process for extracting and comparing entity information to generate a list that ranks entities based on their similarity to a selected entity, according to an embodiment.

DETAILED DESCRIPTION

Figure 1:
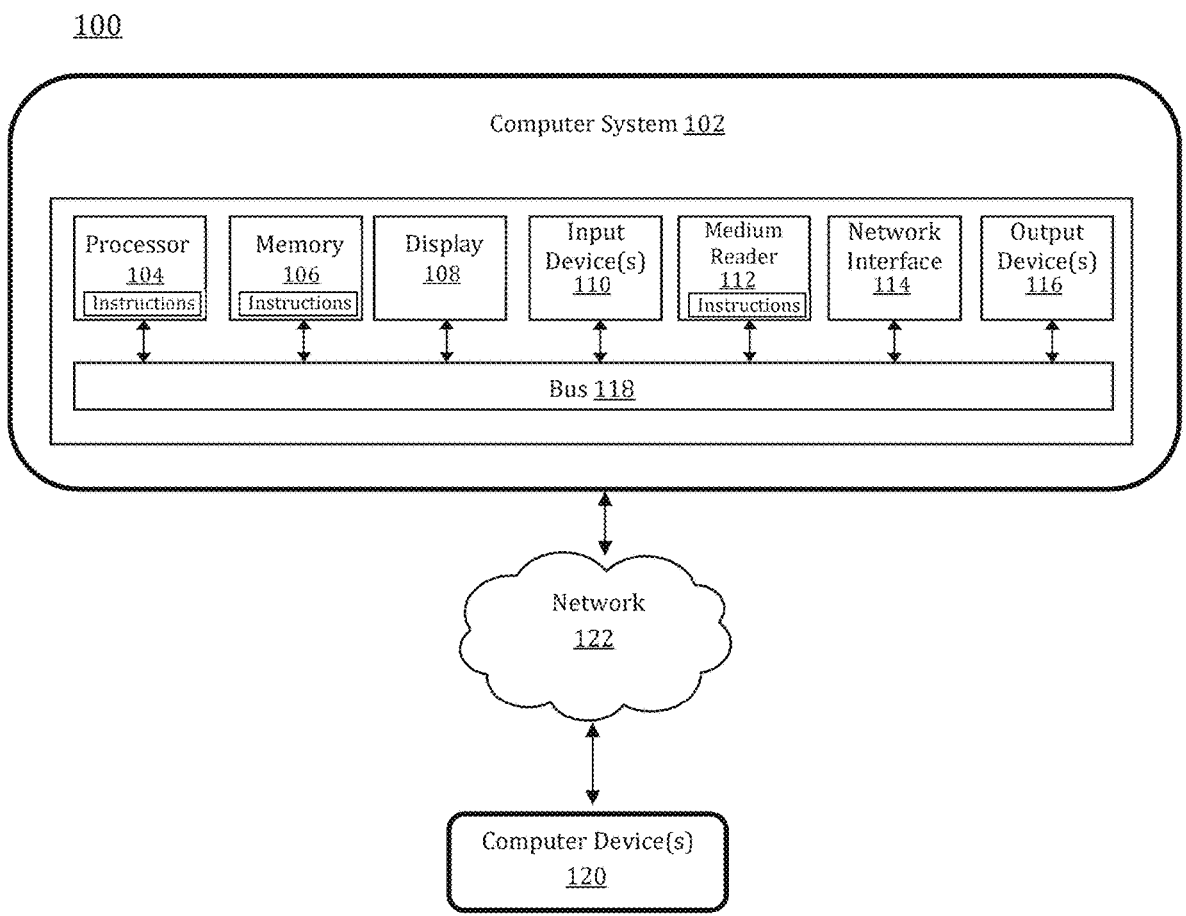
FIG. 1 illustrates a computer system for extracting and comparing entity information to generate a list that ranks entities based on their similarity to a selected entity, according to an embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or similar, they may be programmed using software (e.g., microcode) to perform various functions discussed herein and may optionally be driven by firmware and/or software. Alternatively, each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of the example embodiments may be physically separated into two or more interacting and discrete blocks, units, and/or modules without departing from the scope of the inventive concepts. Further, the blocks, units and/or modules of the example embodiments may be physically combined into more complex blocks, units, and/or modules without departing from the scope of the present disclosure.

A system or method disclosed herein increases speed, efficiency, consistency, and accuracy for pricing illiquid bonds, while reducing unnecessary system memory requirements and computing resources by integrating multiple mechanisms required for generating the pricing of illiquid bonds, onto a single system or platform. Particularly, the system works by receiving a request to determine pricing for an illiquid financial instrument (i.e., does not have a readily accessible or measurable price). The financial instrument is associated with a particular entity and the system queries a number of data sources that may contain information about that entity. The system then identifies at least one primary data source associated with the entity and extracts information from the primary data source(s) about the entity. The system then formats the extracted information and generates a vector representation of the formatted information. The system then compares the generated vector representation of the entity information to a plurality of other vector representations that represent information about other entities. Based on that comparison the system generates a similarity ranking list that lists the entities that are most similarly to the original entity. This similarity ranking list and the corresponding information is then used to generate a price estimate for the otherwise illiquid financial instrument.

This system integrates a series of mechanisms and systems, which would normally require a number of different third-party systems and unintegrated software, into a single integrated platform, thus significantly reducing unnecessary system memory. Additionally, the system improves computer functionality by eliminating unnecessary communication with third party servers and/or unintegrated software. Thus, this system improves speed, efficiency, consistency, and accuracy for pricing illiquid bonds.

FIG. 1 is a system 100 for extracting and comparing entity information to generate a list that ranks entities based on their similarity to a selected entity in accordance with an embodiment. The system 100 is generally shown and may include a computer system 102, which is generally indicated.

The computer system 102 may include a set of instructions that may be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks, or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions may be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, may be used to perform one or more of the methods and processes as described herein. In an embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, and serial advanced technology attachment.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that networks 122 are not limiting or exhaustive. Also, while the network 122 is shown in FIG.

1 as a wireless network, those skilled in the art appreciate that the network 122 may also be a wired network.

The additional computer device 120 is shown in FIG. 1 may be a personal computer. However, those skilled in the art appreciate that, in alternative embodiments of the present application, the computer device 120 may also be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In some embodiments, the entity matching module implemented by the system 100 may allow for accepting and maintaining content in a data platform to improve transitions to updated data content. The configuration or data files, in some embodiments, may be written using JavaScript Object Notation (JSON), but the disclosure is not limited thereto. For example, the configuration or data files may easily be extended to other readable file formats such as Extensible Markup Language (XML), Yet Another Markup Language (YAML), or any other configuration based languages.

In accordance with various embodiments of the present disclosure, the methods described herein may be implemented using a hardware computer system that executes software programs. Further, in a non-limited embodiment, implementations can include distributed processing, component/object distributed processing, and an operation mode having parallel processing capabilities. Virtual computer system processing may be constructed to implement one or more of the methods or functionalities as described herein, and a processor described herein may be used to support a virtual processing environment.

Figure 2:
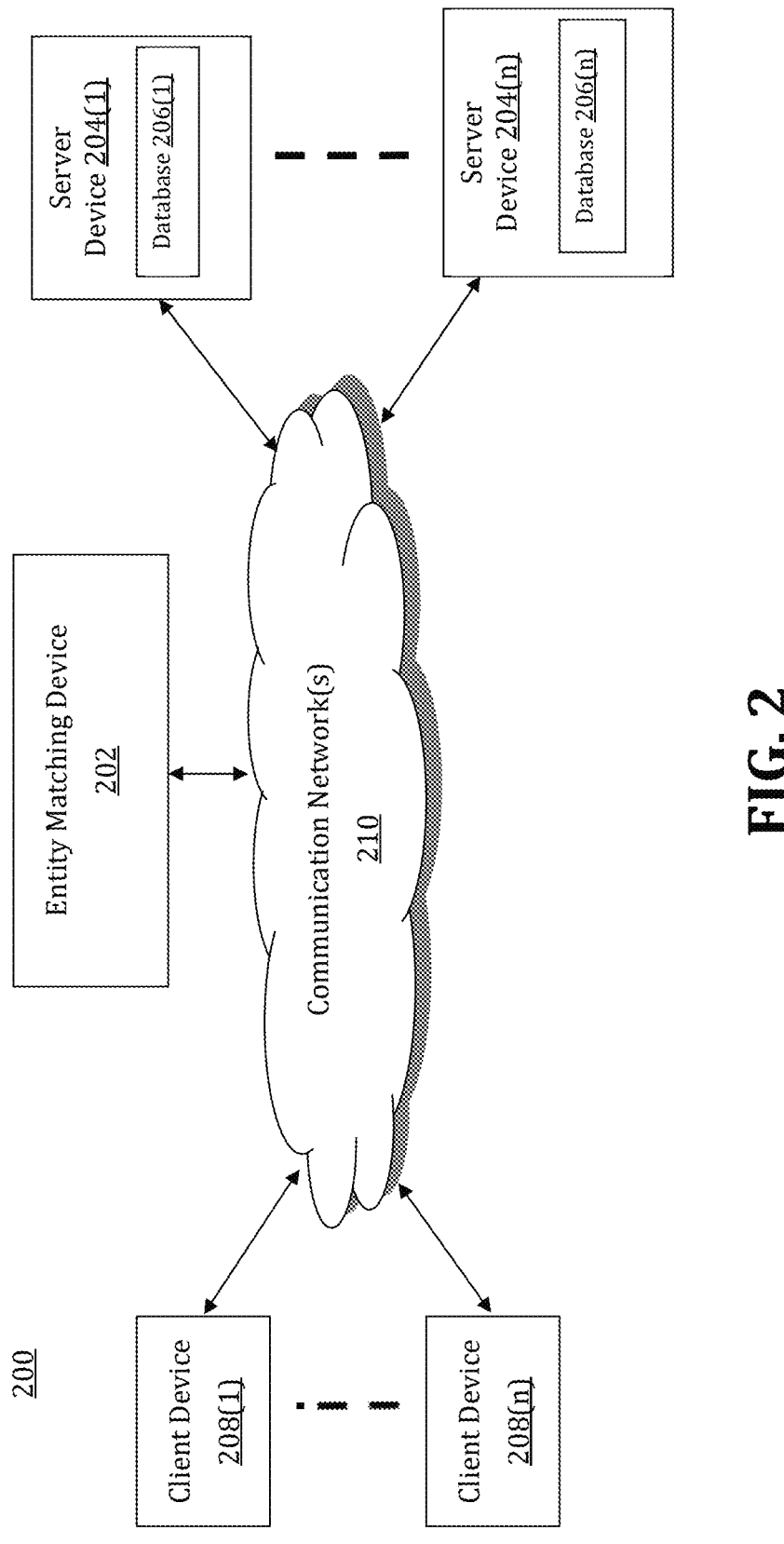
FIG. 2 illustrates a diagram of a network environment for extracting and comparing entity information to generate a list that ranks entities based on their similarity to a selected entity, according to an embodiment.

Referring to FIG. 2, a schematic of a network environment 200 for extracting and comparing entity information to generate a list that ranks entities based on their similarity to a selected entity is illustrated.

In some embodiments, the above-described problems associated with conventional tools may be overcome by implementing an entity matching device 202 as illustrated in FIG. 2 that may be configured for extracting and comparing entity information to generate a list that ranks entities based on their similarity to a selected entity, but the disclosure is not limited thereto.

The entity matching device 202 may include one or more computer systems 102, as described with respect to FIG. 1, which in aggregate provide the necessary functions.

The entity matching device 202 may store one or more applications that can include executable instructions that, when executed by the entity matching device 202, cause the entity matching device 202 to perform actions, such as to transmit, receive, or otherwise process network messages, for example, and to perform other actions described and illustrated below with reference to the figures. The application(s) may be implemented as modules or components of other applications. Further, the application(s) may be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the entity matching device 202 itself, may be located in virtual server (s) running in a cloud-based computing environment rather than being tied to one or more specific physical network computing devices. Also, the application(s) may be running in one or more virtual machines (VMs) executing on the entity matching device 202. Additionally, in one or more embodiments of this technology, virtual machine(s) running on the entity matching device 202 may be managed or supervised by a hypervisor.

In the network environment 200 of FIG. 2, the entity matching device 202 may be coupled to a plurality of server devices 204(1)-204(n) that hosts a plurality of databases 206(1)-206(n), and also to a plurality of client devices 208(1)-208(n) via communication network(s) 210. A communication interface of the entity matching device 202, such as the network interface 114 of the computer system 102 of FIG. 1, operatively couples and communicates between the entity matching device 202, the server devices 204(1)-204 (n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the entity matching device 202, the server devices 204(1)-204(n), and/or the client devices 208(1)-208 (n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use Transmission Control Protocol/Internet Protocol (TCP/IP) over Ethernet and industry-standard protocols, although other types and/or numbers of protocols and/or communication networks may be used. The communication network(s) 210 in this example may employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like.

The entity matching device 202 may be a standalone device or integrated with one or more other devices or apparatuses, such as one or more of the server devices 204(1)-204(n), for example. In one example, the entity matching device 202 may be hosted by one of the server devices 204(1)-204(n), and other arrangements are also possible. Moreover, one or more of the devices of the entity matching device 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the entity matching device 202 via the communication network(s) 210 according to the Hypertext Transfer Protocol (HTTP)-based and/or JSON protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

In some embodiments, the client devices 208(1)-208(n) in this example may include any type of computing device that can facilitate the implementation of the entity matching device 202 that may efficiently provide a platform for extracting and comparing entity information to generate a list that ranks entities based on their similarity to a selected entity, but the disclosure is not limited thereto.

The client devices 208(1)-208(n) may run interface applications, such as standard web browsers or standalone client applications, which may provide an interface to communicate with the entity matching device 202 via the communication network(s) 210 in order to communicate user requests. The client devices 208(1)-208(n) may further include, among other features, a display device, such as a display screen or touchscreen, and/or an input device, such as a keyboard, for example.

Although the network environment 200 with the entity matching device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the entity matching device 202, the server devices 204(1)-204(n), or the client devices 208(1)-208(n), for example, may be configured to operate as virtual instances on the same physical machine. For example, one or more of the entity matching devices 202, the server devices 204(1)-204(n), or the client devices 208(1)-208(n) may operate on the same physical device rather than as separate devices communicating through communication network(s) 210. Additionally, there may be more or fewer entity matching devices 202, server devices 204(1)-204(n), or client devices 208(1)-208(n) than illustrated in FIG. 2. In some embodiments, the entity matching device 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
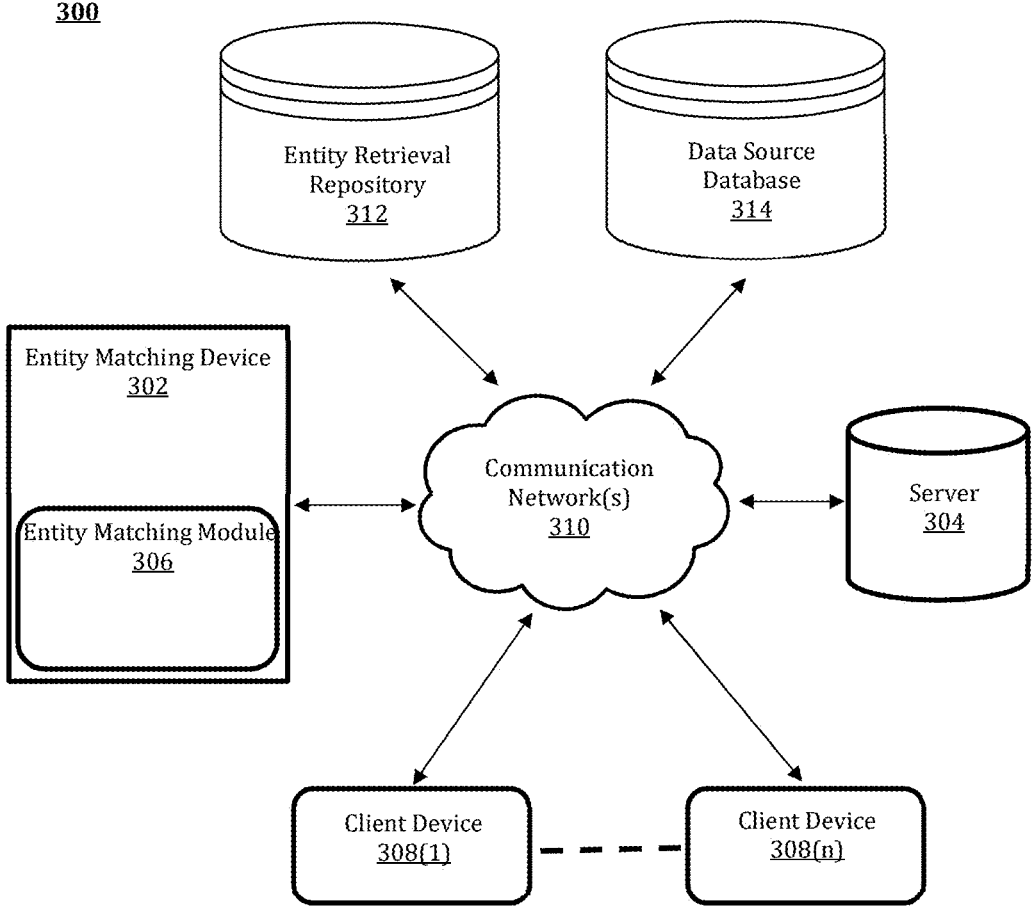
FIG. 3 illustrates a system diagram of a system for extracting and comparing entity information to generate a list that ranks entities based on their similarity to a selected entity, according to an embodiment.

FIG. 3 illustrates a system diagram for extracting and comparing entity information to generate a list that ranks entities based on their similarity to a selected entity in accordance with an embodiment.

As illustrated in FIG. 3, the system 300 may include an entity matching device 302 within which an entity matching module 306 is embedded, a server 304, an entity retrieval repository 312, a data source database 314, a plurality of client devices 308(1) . . . 308(n), and a communication network 310.

In some embodiments, the entity matching device 302 including the entity matching module 306 may be connected to the server 304, the entity retrieval repository 312, and the data source database 314 via the communication network 310. The entity matching device 302 may also be connected to the plurality of client devices 308(1) . . . 308(n) via the communication network 310, but the disclosure is not limited thereto. The entity retrieval repository 312 and the data source database 314 may include one or more repositories or databases.

In an embodiment, the entity matching device 302 is described and shown in FIG. 3 as including the entity matching module 306, although it may include other rules, policies, modules, databases, or applications, for example. In some embodiments, the entity retrieval repository 312 and the data source database 314 may be configured to store ready to use modules written for each API for all environments. Although only one database is illustrated in FIG. 3, the disclosure is not limited thereto. Any number of desired databases may be utilized for use in the disclosed invention herein. The entity retrieval repository 312 and the data source database 314 may be a mainframe database, a log database that may produce programming for searching, monitoring, and analyzing machine-generated data via a web interface, but the disclosure is not limited thereto. In addition, the entity retrieval repository 312 and the data source database 314 may store a plurality of data sets and/or entity information.

In some embodiments, the entity matching module 306 may be configured to receive real-time feed of data from the plurality of client devices 308(1) . . . 308(n) and secondary sources via the communication network 310.

The entity matching module 306 may be configured to: receive a request to determine an estimate for a first instrument that relates to a first entity from among a plurality of entities; for each respective entity from among the plurality of entities, generate a respective query to identify corresponding first data sources that contain respective data about the respective entity; for each respective entity from among the plurality of entities, identify, using the generated respective query, the corresponding first data sources from a system of computer networks; for each respective entity from among the plurality of entities, filter, based on predetermined filtering criteria, the corresponding first data sources in order to determine at least one respective primary data source; for each respective entity from among the plurality of entities, extract corresponding first information that relates to the respective entity from the at least one respective primary data source; for each respective entity from among the plurality of entities, identify using a large language model (LLM), corresponding entity-specific information based on the extracted corresponding first information; for each respective entity from among the plurality of entities, format, using the LLM, the identified corresponding entity-specific information into a predetermined format; for each respective entity from among the plurality of entities, generate, via a Transformer-based Sentence Embedding model, a vector representation of the formatted identified corresponding entity-specific information; compare the respective generated vector representation of the first entity with each respective generated vector representation of the plurality of entities; and generate a similarity ranking that list each respective entity from among the plurality of entities in relation to the first entity based on a result of the comparing.

The plurality of client devices 308(1) . . . 308(n) are illustrated as being in communication with the entity matching device 302. In this regard, the plurality of client devices 308(1) . . . 308(n) may be "clients" (e.g., customers) of the entity matching device 302 and are described herein as such. Nevertheless, it is to be known and understood that the plurality of client devices 308(1) . . . 308(n) need not necessarily be "clients" of the entity matching device 302, or any entity described in association therewith herein. Any additional or alternative relationship may exist between either or both plurality of client devices 308(1). 308(n) and the entity matching device 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. In some embodiments, the server 304 may be the same or equivalent to the server device 204 as illustrated in FIG. 2.

The process may be executed via the communication network 310, which may comprise plural networks as described above. For example, in an embodiment, one or more of the pluralities of client devices 308(1) . . . 308(n) may communicate with the entity matching device 302 via broadband or cellular communication. Of course, these embodiments are merely exemplary and are not limiting or exhaustive.

The client devices 308(1)-308(n) may be the same or similar to any one of the client devices 208(1)-208(n) as described with respect to FIG. 2, including any features or combination of features described with respect thereto. The entity matching device 302 may be the same or similar to the entity matching device 202 as described with respect to FIG. 2, including any features or combination of features described with respect thereto.

Upon being started, the entity matching device 302 executes a process for extracting and comparing entity information to generate a list that ranks entities based on their similarity to a selected entity.

Referring to FIG. 4, a process 400 for extracting and comparing entity information to generate a list that ranks entities based on their similarity to a selected entity is illustrated, according to an embodiment.

In process 400 of FIG. 4, at step S402, the entity matching device 302 may receive an estimate request for a first instrument of a first entity. In an embodiment, the request may be for an estimate that is not readily determinable. For example, the request may relate to the pricing of a financial instrument for a particular entity in which there is infrequent trading and limited data, such that an accurate price quote does not readily exist. In some embodiments, the first instrument may be an illiquid bond and the first entity may be an issuer and/or a company that issues the illiquid bond.

At step S404, the entity matching device 302 may generate at least one respective query for each respective entity from among a plurality of entities to identify at least one data source that contains data about the respective entity. The entity matching device 302 may also identify each corresponding data source using the generated respective queries. The plurality of entities may include the first entity. In an embodiment, the data sources may include websites, Uniform Resource Locators (URLs), search platform results, or online sources.

At step S406, the entity matching device 302 may filter the identified data sources to at least one primary data source. In an embodiment, the entity matching device 302 may use predetermined filtering criteria for selecting the respective at least one primary data source from the corresponding first data sources. In some embodiments, the primary data sources may be selected to include at least one from among the respective entity's "About Us" page from the entity's website and/or the respective entity's wiki (e.g., Wikipedia) page.

At step S408, the entity matching device 302 may extract information about the entity from the at least one primary data source. In an embodiment, the extracting of information about the entity may include parsing a markup language of the at least one respective primary data source to obtain textual content corresponding to relevant sections of the primary data source. In an embodiment, the extracting of information about the entity may also include using an API to collect summaries and specific sectional data from the at least one respective primary data source.

At step S410, the entity matching device 302 may identify specific information about the entity from the extracted information. In an embodiment, the entity matching device 302 may use an LLM to identify the specific information. In some embodiments, the entity-specific information may include at least one from among a geographical location of the respective entity, a summary of information that relates to the respective entity, at least one industry keyword that relates to the respective entity, and an industry summary of information that relates to an industry for which the respective entity belongs.

In an embodiment, the entity matching device 302 may use the LLM and the extracted information to determine, for each respective entity, at least one from among a corresponding sector definition that relates to a sector of an economy, a corresponding group definition that relates to a portion of the sector that corresponds to a first predetermined criteria, and a corresponding subgroup definition that relates to a portion of the group that corresponds to a second predetermined criteria. The entity matching device 302 may then classify each respective entity into a corresponding sector, a corresponding group, and a corresponding subgroup, based on the determined corresponding definitions. For example, according to an embodiment, a respective entity might be classified as operating in the technology sector of the economy, in the software group of that sector, and in the enterprise software subgroup of that group. The sector of an economy may include a sector of an international economy or a national economy.

In some embodiments, the classifying of the respective entities may include performing a top-down approach and a bottom-up approach and combining the results from the top-down approach and the bottom-up approach to generate the results of the classifying. For example, according to an embodiment, the top-down approach may include: first, classifying, based on the extracted information about the entity, the respective entity into a corresponding sector; next, classifying, based on the extracted information about the entity, the respective entity into a corresponding group belonging to the previously classified corresponding sector; and then, classifying, based on the extracted information about the entity, the respective entity into a corresponding subgroup belonging to the previously classified corresponding group. The bottom-down approach may include: first, classifying, based on the extracted information about the entity, the respective entity into a corresponding subgroup; next, classifying, based on the extracted information about the entity, the respective entity into a corresponding group belonging to the previously classified corresponding subgroup; and then, classifying based on the extracted information about the entity, the respective entity into a corresponding sector belonging to the previously classified corresponding group.

At step S412, the entity matching device 302 may format the specific information about the entity into a predetermined format. In an embodiment, the formatting of the specific information may include extracting keywords from the corresponding specific information and converting the extracted keywords into natural language phrasing that describes a corresponding area of operation of the respective entity.

At step S414, the entity matching device 302 may generate, for each respective entity, vector representations of the specific information about the entity. In some embodiments, the entity matching device 302 may use a Transformer-based Sentence Embedding model to generate the vector representations, such that the entity specific information is broken down into standardized vector representations (i.e., numerical representations) that can be more easily and accurately compared to one another. In an embodiment, the vector representations may include the LLM generated summaries and the natural language phrasing description of the corresponding area of operation of the respective entity. In some embodiments, the entity matching device 302 may also generate vector representations of the subgroup definitions that were determined for each respective entity. In some embodiments, the entity matching device 302 may generate multiple vector representations for each respective entity. The multiple vector representations may include an entity website summary vector representation, an entity wiki page summary vector representation, an entity website keyword vector representation, an entity wiki page keyword vector representation, and an industry infobox vector representation, as well as mean and max-pooled vector representations of all the vector representations.

At step S416, the entity matching device 302 may compare the generated vector representation of the first entity with the generated vector representations of all the other entities. In an embodiment, the entity matching device 302 may also compare the sector, group, and subgroup classifications of the first entity with the sector, group, and subgroup classifications of the other respective entities.

Then, at step S418, the entity matching device 302 may generate a ranking that list each respective entity from among the plurality of entities in relation to the first entity. In an embodiment, the ranking is based on the results from comparing the generated vector representations. In some embodiments, the ranking list may also be based on the results of comparing the sector, group, and subgroup classifications of the first entity with the sector, group, and subgroup classifications of the other respective entities. In an embodiment, the entity matching device 302 may calculate a cosine similarity score between the respective generated vector representation of the first entity and the generated vector representations of the other entities. The entity matching device 302 may next rank each respective entity in relation to the first entity based on the respective calculated cosine similarity score. Additionally, the entity matching device 302 may next match each respective entity to a corresponding CUSIP identification that is then used in the ranking list. In some embodiments, the entity matching device 302 may identify similar entities from the generated ranking list that have instruments (e.g., bonds) that are comparable to the first instrument. The entity matching device 302 may then determine an estimate for the first instrument based on pricing of the comparable instruments. For example, according to an embodiment, the entity matching device 302 may aggregate the prices of the relevant financial instrument(s) of the most similar entities that have liquid (i.e., readily available) price quotes, from the ranking list, to serve as a proxy value for the first instrument. In some embodiments, the price of the financial instrument of the most similar entity from the ranking list may serve as the proxy value of the first instrument.

Referring to FIG. 5, a flow diagram of a process 500 for extracting and comparing entity information to generate a list that ranks entities based on their similarity to a selected entity is illustrated, according to an embodiment. As illustrated in FIG. 5, the process 500 leverages AI and NLP techniques to identify comparable issuers with liquid bonds and their corresponding CUSIPs to price illiquid bonds. The process 500 is structured into three sequential modules: public information discovery module 502; issuer profiling module 504, and proxy matching module 506.

At the public information discovery module 502, the public information discovery component is utilized to gather all available information about issuers with illiquid bonds and target issuers with liquid bonds from the web. Each issuer is associated with several unique CUSIPs that belong to a parent company. This module involves three key steps, as further detailed in FIG. 6: searching for relevant websites, filtering these websites to select the most reliable sources, and extracting the relevant content for further processing.

Website Search: to find relevant information for a particular issuer, the entity matching device 302 starts by formulating a query. Given the issuer's name, the entity matching device 302 builds the query as Issuer_name+ about. This query formulation may be effective, however, other formulations may also be used. The entity matching device 302 may then send this query to a search engine to find relevant websites. The entity matching device 302 may select only the first five websites. If the initial search does not yield relevant information, the entity matching device 302 may reformulate the query using the parent company's name, structured as Parent_name+about, and repeats the procedure. This iterative approach may help in capturing comprehensive information about the issuer.

Website Filtering: to enhance the accuracy of obtaining correct information about the issuer, the entity matching device 302 may focus on selecting the most reliable and accurate sources. Specifically, the entity matching device 302 may consider two primary sources: the company's official website and a wiki page (e.g., Wikipedia page). On the company's official website, the entity matching device 302 may specifically look for the About Us page (or similar pages) that provide detailed information about the issuer. To ensure that only these types of websites are selected, the entity matching device 302 may employ a filtering algorithm. If the first five returned websites do not contain the desired information (such as About Us pages or wiki pages), the entity matching device 302 may continue to fetch the next five websites from the search engine results until the relevant information is found. This ensures that the entity matching device 302 gathers high-quality and accurate data.

Content Extraction: after obtaining the relevant websites, the entity matching device 302 may proceed to extract the content. For the About Us page (or similar pages) on the company's official website, the entity matching device 302 may parse the HTML to extract the text content. This involves identifying and isolating the relevant sections of the webpage that contain the necessary information. For the wiki pages, the entity matching device 302 may employ two different extraction strategies. First, the entity matching device 302 may use an official wiki API (e.g., MediaWiki API) to collect summaries and extract infobox data, which provides structured information about the issuer. Second, the entity matching device 302 may parse the HTML content of the wiki page to extract additional relevant text. The extracted information, along with its sources (e.g., Wikipedia, official website), may then be stored in a structured format for subsequent processing steps.

After gathering all relevant information for both issuers with illiquid bonds and target issuers with liquid bonds, the entity matching device 302 may transition to the issuer profiling module 504, which employs a novel approach for issuer profiling. This module may utilize LLMs to refine and clean web-extracted descriptions, generating comprehensive profiles for the target issuers. The LLMs may be trained on extensive datasets, enabling them to understand language and context for accurate information extraction and coherent, contextually appropriate text generation. Unlike traditional machine learning approaches, LLMs demonstrate exceptional performance in various downstream NLP tasks, including information extraction and summarization, without the need for additional task-specific labeled data. Utilizing the issuer descriptions obtained in the public information discover module 502, the issuer profiling module 504 may execute the following steps: data refinement, semantic representations, and industry classifications.

Data Refinement. In this step, the entity matching device 302 may focus on refining the raw data extracted from various web sources to ensure it is accurate and useful. The entity matching device 302 may employ various prompts to clean and extract specific pieces of information from the issuer descriptions. This may include: 1) Location of Operation: identifying the geographical regions where the issuer operates; 2) Brief Summary of the Issuer: creating a concise overview of the issuer's business activities and core competencies; 3) Industry-Related Keywords: extracting key terms that are relevant to the issuer's industry, which helps in categorizing and understanding the issuer's market position. Additionally, the entity matching device 302 may leverage LLMs to generate definitions for the three levels of industry classification: sectors, groups, and subgroups-within a predefined taxonomy provided by the business. This may ensure that each subgroup is clearly defined and contextualized within the broader industry framework. For example, if an issuer operates in the Technology sector, the LLMs may generate definitions for related groups like "Software" and subgroups like "Enterprise Software."

Semantic Representation: In this step, the entity matching device 302 may create a detailed and nuanced representation of each issuer by transforming the extracted information into a structured format. After obtaining the refined information utilizing the LLM, the entity matching device 302 may preprocess it, which includes converting the keywords extracted from the issuer descriptions and the industries obtained from the wiki (e.g., Wikipedia infobox) into complete sentences that represent the issuer's areas of operation. For instance, if the keywords are cloud computing and data analytics, the sentence might be: "The company specializes in cloud computing and data analytics." The entity matching device 302 may then use a Transformer-based Sentence Embedding model to generate vector representations for the LLM-generated summaries and the sentences highlighting the issuer's operations. Each representation is considered a view, thus obtaining a multi-view representation for the issuers. These multi-view vector representations collectively compose the semantic profile of the issuer. Additionally, following the similar approach, the entity matching device 302 may generate vector representations for the subgroup definitions obtained in the previous step. This helps in aligning the issuer's profile with the predefined industry taxonomy.

The different feature representations in the multi-view semantic issuer representation may include: 1) Company and Wiki Summary: leveraging the Sentence Embedding model to generate vector representations for each of the short summaries generated by LLMs in the previous step. These summaries provide a high-level overview of the issuer's operations and market position. 2) Company and Wiki Keywords: keywords may be extracted and embedded from both the company descriptions and wiki entries to capture essential thematic elements, helping in identifying the core areas of the issuer's business. 3) Infobox Industries: for example, according to an embodiment, the entity matching device 302 may prepend the phrase "The company operates in the following area"—to the list of infobox industries and generate sentence embeddings for these augmented descriptions, ensuring that the industry context is clearly articulated and embedded. 4) Mean and Max-Pooled Representations: additionally, the entity matching device 302 may obtain mean and max-pooled representations for the company and wiki summaries, company and wiki keywords, and between the summaries, keywords, and infobox industries.

Classification. In this step, the entity matching device 302 may classify issuers into specific sectors, groups, and subgroups using a bottom-up approach. The entity matching device 302 may first classify the issuer into subgroups based on the multi-view semantic representations. For example, if an issuer is involved in Enterprise Software, it will be classified under the relevant subgroup. Based on the taxonomy, the entity matching device 302 may then identify the corresponding groups and sectors. For instance, Enterprise Software might fall under the Software Group, which in turn is part of the Technology Sector. The entity matching device 302 may leverage a Nearest-Neighbor (NN) classifier for this task, utilizing cosine similarity between the representations of the subgroup definitions and the multi-view issuer semantic representations as the distance metric. The entity matching device 302 may consider the top-5 predictions for each view and combine the predictions from all multi-view representations to ensure robust and accurate classification.

In the proxy matching module 506, the entity matching device 302 may identify a list of comparable candidates, specifically the relevant CUSIPs of issuers with liquid bonds, for an issuer of an illiquid bond. This process, shown in FIG. 8, may build upon the profiles constructed in the issuer profiling module 504 and may involve a multi-stage approach that combines semantic representation and weighted ranking to derive the most relevant and comparable candidates.

Issuer Matching: semantic score. The first stage may involve calculating the semantic similarity between the issuer's description and associated keywords with those of issuers with liquid bonds. This is achieved by generating embedding vectors for each issuer's description and keywords, and then computing the cosine similarity between the query issuer and each target issuer. To begin, the entity matching device 302 may generate embedding vectors for the descriptions and keywords of both the query issuer, which is the issuer with the illiquid bond, and the target issuers, which are the issuers with liquid bonds. These embeddings may be high-dimensional representations of the text data, capturing the semantic meaning of the descriptions and keywords. The semantic score, denoted as S, is calculated as follows: $S=\alpha \cdot S_{description}+(1-\alpha)\cdot S_{keywords}$; where $\alpha$ is a weight value between 0 and 1, and is tuned using a downstream task of industry sector classification, as explained in the issuer profiling module 504.

The description similarity ($S_{description}$) may measure the cosine similarity between the query issuer's description embedding and each target issuer's description embedding: $S_{description}=\cos\_sim(q_d, t_{dj})$; where $q_d$ is the query description embedding, and $t_{dj}$ is the target issuer's description embedding.

For the keyword similarity, the entity matching device 302 may calculate the cosine similarity between each pair of keyword embeddings from the query and target issuers. The top 10% of these similarity scores are averaged to compute the keyword score:

$$S_{keywords} = \frac{1}{0.1|Q|} \sum_{\substack{i \in Top10\% \\ (q_{k_i}, t_{k_{j,l}}) \in Q}} \cos\_sim(q_{k_i}, t_{k_{j,l}})$$

Where Q is the set of cosine similarity scores, $q_{k_i}$ represents each query keyword embedding, and $t_{k_{j,l}}$ represents each target issuer keyword embedding.

By focusing on the top 10% of keyword similarity scores, the entity matching device 302 may mitigate the noise introduced by the disparity in the number of keywords generated for each issuer. This ratio may also be tuned using the downstream task of industry sector classification.

Figure 8:
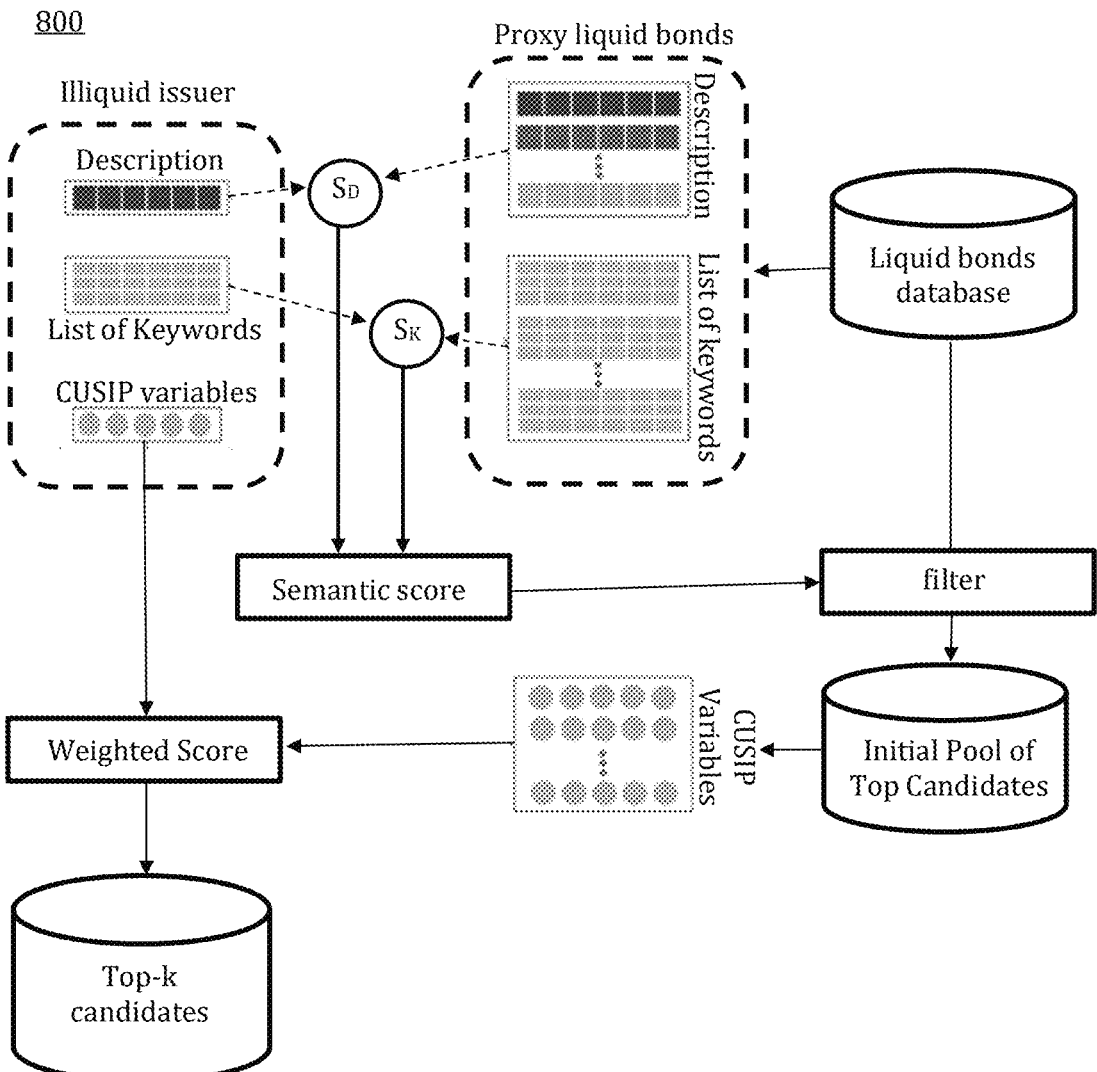
FIG. 8 illustrates a proxy matching diagram of a process for extracting and comparing entity information to generate a list that ranks entities based on their similarity to a selected entity, according to an embodiment.

The semantic score may be used as a first filter criterion to obtain top-k similar liquid bonds, in which k is determined by the user and may have a default value (e.g., 10). Then, CUSIP-level matching may be performed only on this pre-selected candidate list. This is illustrated in FIG. 8, where the filter is fed by the semantic score and the liquid bonds database.

CUSIP-Level Matching: weighted score. Once the entity matching device 302 identifies the top liquid issuers based on semantic similarity, the entity matching device 302 may proceed to the CUSIP level to find the best CUSIP-level proxies for the corresponding illiquid issuers. This step involves a detailed analysis of relevant variables at the CUSIP level, which can include various market factors such as location, currency, credit ratings, industry sector, and other pertinent attributes. Each of these variables may be assigned a weight, denoted as $w_i$, based on expert input to reflect their relative importance. The sum of all weights is normalized to equal one, ensuring a balanced evaluation. The weighted score, represented as W, is calculated using the following formula:

$$W = \sum_{i=1}^{n} w_i \cdot M(C_i)$$

where $M(C_i)$ is a match indicator function that returns 1 if the variable $C_i$ matches between the query and the target issuer, and 0 otherwise. This weighted score may reflect the degree to which each candidate matches user-specified criteria.

CUSIP-Level Matching: ranking criteria. The final ranking to retrieve the top-k comparable issuers at the CUSIP level with liquid bonds may be determined by selecting candidates based on the maximum weighted score, denoted as Wk. This weighted score may incorporate various relevant factors, ensuring a comprehensive evaluation of each candidate. In the event of a tie, where multiple candidates have the same weighted score, the semantic score, denoted as $S_k$, may be used as a tiebreaker to further differentiate between the candidates based on their semantic similarity. If further ties occur at the CUSIP level, additional ordinal variables such as credit rating, average life, or other relevant financial metrics may be employed as secondary tiebreakers. This multi-criteria approach may ensure that the most relevant and comparable issuers are selected, providing a robust and accurate list of candidates for pricing illiquid bonds.

$$Rank = \arg \max_{k \in candidates} (W_k, S_k)$$

To enhance the accuracy and relevance of the issuer profiling and proxy matching process, the entity matching device 302 may also incorporate Human-in-the-Loop. This approach may leverage human expertise to refine and validate the results generated by the pipeline, ensuring that the final output meets the specific needs and expectations of the business users.

Expert Input for Variable Weighting. In the CUSIP Matching stage, expert input may be crucial for determining the weights assigned to various market variables such as location, currency, ratings, and industry sector. Experts may provide insights based on their domain knowledge and experience, ensuring that the weights reflect the relative importance of each variable accurately. This input may be essential for calculating the weighted score (W), which may be used to rank the candidate issuers.

Validation and Final Decision-Making. After calculating the initial semantic and weighted scores, human experts may review the top-ranked candidates to verify their relevance and accuracy. This may involve cross-checking the automated results with additional qualitative and quantitative data that the pipeline may not fully capture. Experts may adjust rankings as needed and make the final selection using their judgment. This oversight ensures that the output is both data-driven and contextually appropriate, aligning with business objectives.

Figure 6:
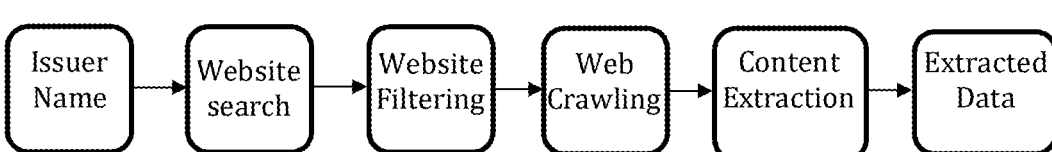
FIG. 6 illustrates an information discovery diagram of a process for extracting and comparing entity information to generate a list that ranks entities based on their similarity to a selected entity, according to an embodiment.

FIG. 6 illustrates an information discovery diagram 600 of a process for extracting and comparing entity information to generate a list that ranks entities based on their similarity to a selected entity, according to an embodiment. Particularly, FIG. 6 illustrates the three key steps of the public information discovery module 502 from FIG. 5. The three steps may include: searching for the relevant websites, filtering the websites to select the most reliable sources, and extracting relevant content for further processing.

Figure 7:
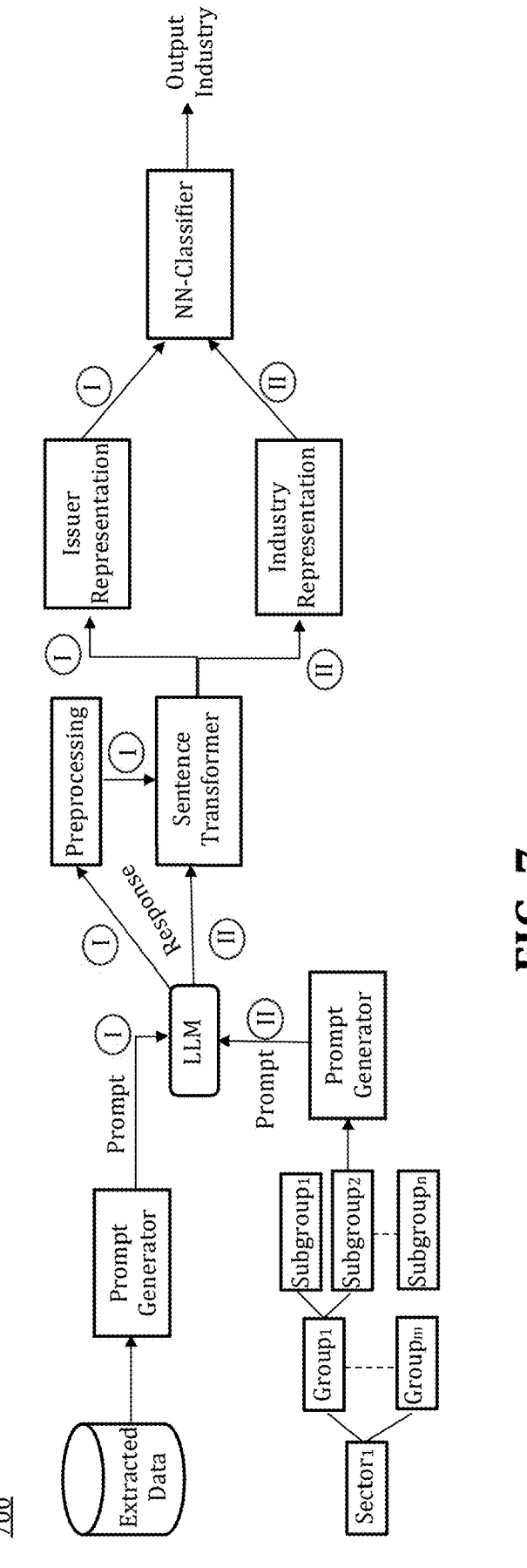
FIG. 7 illustrates a profiling diagram of a process for extracting and comparing entity information to generate a list that ranks entities based on their similarity to a selected entity, according to an embodiment.

FIG. 7 illustrates a profiling diagram 700 of a process for extracting and comparing entity information to generate a list that ranks entities based on their similarity to a selected entity, according to an embodiment. Particularly, FIG. 7 illustrates the architecture of the issuer profiling module 504 from FIG. 5. FIG. 7 illustrates a first input (I) coming from the extracted data generated by the process of the information discovery diagram 600 illustrated in FIG. 6. FIG. 7 also illustrates a second input (II) stemming from the three levels of industry classification: sectors, groups, and subgroups that are within a predefined taxonomy provided by the business.

FIG. 8 illustrates a proxy matching diagram 800 of a process for extracting and comparing entity information to generate a list that ranks entities based on their similarity to a selected entity, according to an embodiment. Particularly, FIG. 8 illustrates the process of the proxy matching module 506 from FIG. 5.

Accordingly, with this technology, an optimized process for extracting and comparing entity information to generate a list that ranks entities based on their similarity to a selected entity is provided.

Although the invention has been described with reference to several exemplary embodiments, it is understood that the words that have been used are words of description and illustration, rather than words of limitation. Changes may be made within the purview of the appended claims, as presently stated, and as amended, without departing from the scope and spirit of the present disclosure in its aspects. Although the invention has been described with reference to particular means, materials, and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for determining similarities between entities, the method being implemented by at least one processor, the method comprising:

receiving, by the at least one processor, a request to determine an estimate for a first instrument that relates to a first entity from among a plurality of entities; for each respective entity from among the plurality of entities, generating, by the at least one processor, a respective query to identify corresponding first data sources that contain respective data about the respective entity; for each respective entity from among the plurality of entities, identifying, by the at least one processor using the generated respective query, the corresponding first data sources from a system of computer networks;

for each respective entity from among the plurality of entities, filtering, by the at least one processor based on predetermined filtering criteria, the corresponding first data sources in order to determine at least one respective primary data source;

for each respective entity from among the plurality of entities, retrieving, by the at least one processor via an application programming interface (API), corresponding first information that relates to the respective entity from the at least one respective primary data source, wherein the retrieving includes parsing web-based code to identify and isolate the corresponding first information;

for each respective entity from among the plurality of entities, identifying, by the at least one processor using a large language model (LLM), corresponding entity-specific information, based on the retrieved corresponding first information;

for each respective entity from among the plurality of entities, formatting, by the at least one processor using the LLM, the identified corresponding entity-specific information into a predetermined format;

for each respective entity from among the plurality of entities, generating, by the at least one processor via a Transformer-based Sentence Embedding model, a vector representation of the formatted identified corresponding entity-specific information;

creating, by the at least one processor and based on the generated vector representation, an embedding vector that includes the entity-specific information of the plurality of entities as high-dimensional representations of text data that provide semantic descriptions of each respective entity from the plurality of entities;

comparing, by the at least one processor using the created embedding vector, the respective generated vector representation of the first entity with each respective generated vector representation of the plurality of entities;

generating, by the at least one processor, a similarity ranking that list each respective entity from among the plurality of entities in relation to the first entity, based on a result of the comparing;

aggregating, by the at least one processor, prices of a predetermined number of entities from among the plurality of entities, based on a result of the generating of the similarity ranking; and outputting, by the at least one processor, a price estimate of the first instrument, based on a result of the aggregating of prices.

2. The method of claim 1, wherein the corresponding entity-specific information includes at least one from among a geographical location of the respective entity, a summary of information that relates to the respective entity, at least one industry keyword that relates to the respective entity, and an industry summary of information that relates to an industry for which the respective entity belongs.

3. The method of claim 1, further comprising:

for each respective entity from among the plurality of entities, generating, by the at least one processor using the LLM and based on the extracted corresponding first information, a corresponding sector definition that relates to a sector of an economy, a corresponding group definition that relates to a portion of the sector that corresponds to a first predetermined criteria, and a corresponding subgroup definition that relates to a portion of the group that corresponds to a second predetermined criteria;

for each respective entity from among the plurality of entities, classifying, by the at least one processor, the respective entity into a corresponding sector from among a plurality of sectors, a corresponding group from among a plurality of groups, and a corresponding subgroup from among a plurality of subgroups based on the results of the generating of the corresponding sector definition, the corresponding group definition, and the corresponding subgroup definition;

comparing, by the at least one processor, the results of the classifying for the first entity with the results of the classifying for each other respective entity; and wherein the generating of the similarity ranking is further based on the results of the comparing of the results of the classifying.

4. The method of claim 3, wherein the classifying further comprises performing a top-down approach and a bottom-up approach, and combining the results from the top-down approach and the bottom-up approach to generate the results of the classifying;

wherein the top-down approach, for each respective entity from among the plurality of entities, comprises:

first, classifying, based on the corresponding first information, the respective entity into a top-down approach corresponding sector;

next, classifying, based on the corresponding first information, the respective entity into a top-down approach corresponding group belonging to the top-down approach corresponding sector; and then, classifying, based on the corresponding first information, the respective entity into a top-down approach corresponding subgroup belonging to the top-down approach corresponding group;

wherein the bottom-up approach comprises:

first, classifying, based on the corresponding first information, the respective entity into a bottom-up approach corresponding subgroup;

next, classifying, based on the corresponding first information, the respective entity into a bottom-up approach corresponding group belonging to the bottom-up approach corresponding subgroup; and then, classifying, based on the corresponding first information, the respective entity into a bottom-up approach corresponding sector belonging to the bottom-up approach corresponding group.

5. The method of claim 1, wherein the extracting of the corresponding first information comprises at least one from among parsing a markup language of the at least one respective primary data source to obtain textual content corresponding to relevant sections of the at least one respective primary data source and using the API to collect summaries and specific sectional data from the at least one respective primary data source.

6. The method of claim 1, wherein the formatting of the identified corresponding entity-specific information into the predetermined format comprises extracting keywords from the corresponding entity-specific information and converting the extracted keywords into natural language phrasing that describes a corresponding area of operation of the respective entity.

7. The method of claim 1, wherein the generating of the similarity ranking comprises:

calculating, by the at least one processor, a cosine similarity score between the respective generated vector representation of the first entity and each respective generated vector representation of the plurality of entities;

ranking, by the at least one processor, each respective entity from among the plurality of entities in relation to the first entity based on the respective calculated cosine similarity score; and matching, by the at least one processor, each respective entity from among the plurality of entities to a corresponding Committee on Uniform Security Identification Procedures (CUSIP) identification that is usable for representing the respective entity in the generated similarity ranking.

8. The method of claim 1, further comprising:

identifying, by the at least one processor based on the generated similarity ranking, at least one similar entity from the plurality of entities that relates to a second instrument that is comparable to the first instrument; and determining, by the at least one processor based on the results of the identifying of the at least one similar entity, the estimate for the first instrument.

9. The method of claim 1, wherein the first instrument is an illiquid bond.

10. A computing apparatus for determining similarities between entities, the computing apparatus comprising:

a processor;

a memory; and a communication interface coupled to each of the processor and the memory, wherein the processor is configured to:

receive a request to determine an estimate for a first instrument that relates to a first entity from among a plurality of entities;

for each respective entity from among the plurality of entities, generate a respective query to identify corresponding first data sources that contain respective data about the respective entity;

for each respective entity from among the plurality of entities, identify, using the generated respective query, the corresponding first data sources from a system of computer networks;

for each respective entity from among the plurality of entities, filter, based on predetermined filtering criteria, the corresponding first data sources in order to determine at least one respective primary data source;

for each respective entity from among the plurality of entities, retrieve, via an application programming interface (API), corresponding first information that relates to the respective entity from the at least one respective primary data source, wherein the retrieving includes parsing web-based code to identify and isolate the corresponding first information;

for each respective entity from among the plurality of entities, identify using a large language model (LLM), corresponding entity-specific information, based on the retrieved corresponding first information;

for each respective entity from among the plurality of entities, format, using the LLM, the identified corresponding entity-specific information into a predetermined format;

for each respective entity from among the plurality of entities, generate, via a Transformer-based Sentence Embedding model, a vector representation of the formatted identified corresponding entity-specific information;

create, based on the generated vector representation, an embedding vector that includes the entity-specific information of the plurality of entities as high-dimensional representations of text data that provide semantic descriptions of each respective entity from the plurality of entities;

compare, using the created embedding vector, the respective generated vector representation of the first entity with each respective generated vector representation of the plurality of entities; and generate a similarity ranking that list each respective entity from among the plurality of entities in relation to the first entity, based on a result of the comparing;

aggregate prices of a predetermined number of entities from among the plurality of entities, based on a result of the generating of the similarity ranking; and output a price estimate of the first instrument, based on a result of the aggregating of prices.

11. The computing apparatus of claim 10, wherein the corresponding entity-specific information includes at least one from among a geographical location of the respective entity, a summary of information that relates to the respective entity, at least one industry keyword that relates to the respective entity, and an industry summary of information that relates to an industry for which the respective entity belongs.

12. The computing apparatus of claim 10, wherein the processor is further configured to:

for each respective entity from among the plurality of entities, generate, using the LLM and based on the extracted corresponding first information, a corresponding sector definition that relates to a sector of an economy, a corresponding group definition that relates to a portion of the sector that corresponds to a first predetermined criteria, and a corresponding subgroup definition that relates to a portion of the group that corresponds to a second predetermined criteria;

for each respective entity from among the plurality of entities, classify the respective entity into a corresponding sector from among a plurality of sectors, a corresponding group from among a plurality of groups, and a corresponding subgroup from among a plurality of subgroups based on the results of the generating of the corresponding sector definition, the corresponding group definition, and the corresponding subgroup definition;

compare the results of the classifying for the first entity with the results of the classifying for each other respective entity; and wherein the generating of the similarity ranking is further based on the results of the comparing of the results of the classifying.

13. The computing apparatus of claim 12, wherein the processor is further configured to:

classify each respective entity by performing a top-down approach and a bottom-up approach, and combining the results from the top-down approach and the bottom-up approach;

wherein the top-down approach, for each respective entity from among the plurality of entities, comprises:

first, classifying, based on the corresponding first information, the respective entity into a top-down approach corresponding sector;

next, classifying, based on the corresponding first information, the respective entity into a top-down approach corresponding group belonging to the top-down approach corresponding sector; and then, classifying, based on the corresponding first information, the respective entity into a top-down approach corresponding subgroup belonging to the top-down approach corresponding group;

wherein the bottom-up approach comprises:

first, classifying, based on the corresponding first information, the respective entity into a bottom-up approach corresponding subgroup;

next, classifying, based on the corresponding first information, the respective entity into a bottom-up approach corresponding group belonging to the bottom-up approach corresponding subgroup; and then, classifying, based on the corresponding first information, the respective entity into a bottom-up approach corresponding sector belonging to the bottom-up approach corresponding group.

14. The computing apparatus of claim 10, wherein the processor is further configured to:

extract the corresponding first information by performing at least one from among parsing a markup language of the at least one respective primary data source to obtain textual content corresponding to relevant sections of the at least one respective primary data source and using the API to collect summaries and specific sectional data from the at least one respective primary data source.

15. The computing apparatus of claim 10, wherein the processor is further configured to:

format the identified corresponding entity specific information into the predetermined format by extracting keywords from the corresponding entity-specific information and converting the extracted keywords into natural language phrasing that describes a corresponding area of operation of the respective entity.

16. The computing apparatus of claim 10, wherein the processor is further configured to:

generate the similarity ranking by:

calculating a cosine similarity score between the respective generated vector representation of the first entity and each respective generated vector representation of the plurality of entities;

ranking each respective entity from among the plurality of entities in relation to the first entity based on the respective calculated cosine similarity score; and matching each respective entity from among the plurality of entities to a corresponding Committee on Uniform Security Identification Procedures (CUSIP) identification that is usable for representing the respective entity in the generated similarity ranking.

17. The computing apparatus of claim 10, wherein the processor is further configured to:

identify, based on the generated similarity ranking, at least one similar entity from the plurality of entities that relates to a second instrument that is comparable to the first instrument; and determine, based on the results of the identifying of the at least one similar entity, the estimate for the first instrument.

18. The computing apparatus of claim 10, wherein the first instrument is an illiquid bond.

19. A non-transitory computer readable storage medium storing instructions for determining similarities between entities, the storage medium comprising executable code which, when executed by a processor, causes the processor to:

receive a request to determine an estimate for a first instrument that relates to a first entity from among a plurality of entities;

for each respective entity from among the plurality of entities, generate a respective query to identify corresponding first data sources that contain respective data about the respective entity;

for each respective entity from among the plurality of entities, identify, using the generated respective query, the corresponding first data sources from a system of computer networks;

for each respective entity from among the plurality of entities, filter, based on predetermined filtering criteria, the corresponding first data sources in order to determine at least one respective primary data source;

for each respective entity from among the plurality of entities, retrieve, via an application programming interface (API), corresponding first information that relates to the respective entity from the at least one respective primary data source, wherein the retrieving includes parsing web-based code to identify and isolate the corresponding first information;

for each respective entity from among the plurality of entities, identify using a large language model (LLM), corresponding entity-specific information, based on the retrieved corresponding first information;

for each respective entity from among the plurality of entities, format, using the LLM, the identified corresponding entity-specific information into a predetermined format;

for each respective entity from among the plurality of entities, generate, via a Transformer-based Sentence Embedding model, a vector representation of the formatted identified corresponding entity-specific information;

create, based on the generated vector representation, an embedding vector that includes the entity-specific information of the plurality of entities as high-dimensional representations of text data that provide semantic descriptions of each respective entity from the plurality of entities;

compare, using the created embedding vector, the respective generated vector representation of the first entity with each respective generated vector representation of the plurality of entities; and generate a similarity ranking that list each respective entity from among the plurality of entities in relation to the first entity, based on a result of the comparing;

aggregate prices of a predetermined number of entities from among the plurality of entities, based on a result of the generating of the similarity ranking; and output a price estimate of the first instrument, based on a result of the aggregating of prices.

20. The storage medium of claim 19, wherein when executed by the processor, the executable code further causes the processor to:

for each respective entity from among the plurality of entities, generate, using the LLM and based on the extracted corresponding first information, a corresponding sector definition that relates to a sector of an economy, a corresponding group definition that relates to a portion of the sector that corresponds to a first predetermined criteria, and a corresponding subgroup definition that relates to a portion of the group that corresponds to a second predetermined criteria;

for each respective entity from among the plurality of entities, classify the respective entity into a corresponding sector from among a plurality of sectors, a corresponding group from among a plurality of groups, and a corresponding subgroup from among a plurality of subgroups based on the results of the generating of the corresponding sector definition, the corresponding group definition, and the corresponding subgroup definition;

compare the results of the classifying for the first entity with the results of the classifying for each other respective entity; and wherein the generating of the similarity ranking is further based on the results of the comparing of the results of the classifying.

* * * * *